US009876632B2

(12) United States Patent
Kawata

(10) Patent No.: US 9,876,632 B2
(45) Date of Patent: Jan. 23, 2018

(54) DATA TRANSMISSION/RECEPTION SYSTEM, TRANSMISSION APPARATUS AND RECEPTION APPARATUS

(71) Applicant: Atsushi Kawata, Kanagawa (JP)

(72) Inventor: Atsushi Kawata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 247 days.

(21) Appl. No.: 14/918,763

(22) Filed: Oct. 21, 2015

(65) Prior Publication Data

US 2016/0134416 A1 May 12, 2016

(30) Foreign Application Priority Data

Nov. 6, 2014 (JP) ................................ 2014-226112

(51) Int. Cl.
*H04L 7/00* (2006.01)
*H04L 7/04* (2006.01)
*H04L 1/00* (2006.01)

(52) U.S. Cl.
CPC .............. *H04L 7/04* (2013.01); *H04L 1/0071* (2013.01)

(58) Field of Classification Search
CPC ................................ H04L 7/04; H04L 1/0071
See application file for complete search history.

(56) References Cited

U.S. PATENT DOCUMENTS 6,490,243 B1 12/2002 Tanaka et al.
6,662,334 B1 * 12/2003 Stenfort ............. G11B 20/1833 714/769
7,327,818 B2 2/2008 Kojima et al.
2015/0019921 A1 * 1/2015 Chen ....................... H03M 5/06 714/701
2015/0067695 A1 * 3/2015 Hamamoto ........... G06F 9/5016 718/104

FOREIGN PATENT DOCUMENTS

JP H06-119715 4/1994
JP H11-191758 7/1999
JP 2004-208009 7/2004

* cited by examiner

*Primary Examiner* — Melvin Marcelo
(74) *Attorney, Agent, or Firm* — IPUSA, PLLC

(57) ABSTRACT

There is provided a data transmission/reception system for performing a data communication using interleaving, comprising: a transmission apparatus configured to transmit data in which a synchronization signal including identification data is included; and a reception apparatus configured to extract the synchronization signal from the data received from the transmission apparatus, wherein upon detecting that the extracted synchronization signal is not coincident with any one of a plurality of predetermined code strings, the reception apparatus replaces the extracted synchronization signal with one predetermined code string among the plurality of predetermined code strings, wherein an inter-code word distance between the one predetermined code string and the extracted synchronization signal is the smallest among the calculated inter-code word distances; and the reception apparatus identifies a storage unit for storing the data received from the transmission apparatus based on the identification data included in the replaced synchronization signal.

8 Claims, 14 Drawing Sheets

S201 RECEIVE DATA
S202 DATA AT DETECTED POSITION IS COINCIDENT WITH SYN0 OR SYN1? — YES / NO
S203 OUTPUT INPUT DATA WITHOUT CORRECTING IT
S204-1 CALCULATE INTER-CODE WORD DISTANCES
S204-2 IDENTIFY CODE STRING ASSOCIATED WITH MINIMUM INTER-CODE WORD DISTANCE
S204-3 CORRECT INPUT DATA SO AS TO REPLACE DATA AT DETECTED POSITION WITH IDENTIFIED SYMBOL STRING TO OUTPUT IT
S205 WRITE DATA IN COLUMN DIRECTION INTO MEMORY SELECTED IN ACCORDANCE WITH HEADER
S206 RETRIEVE DATA IN ROW DIRECTION, AND ADD HEADER IN ACCORDANCE WITH MEMORY FROM WHICH DATA RETRIEVED
S207 WRITE DATA INTO THE OTHER MEMORY

SYN1

IMAGE DATA

ECC

FIG.3

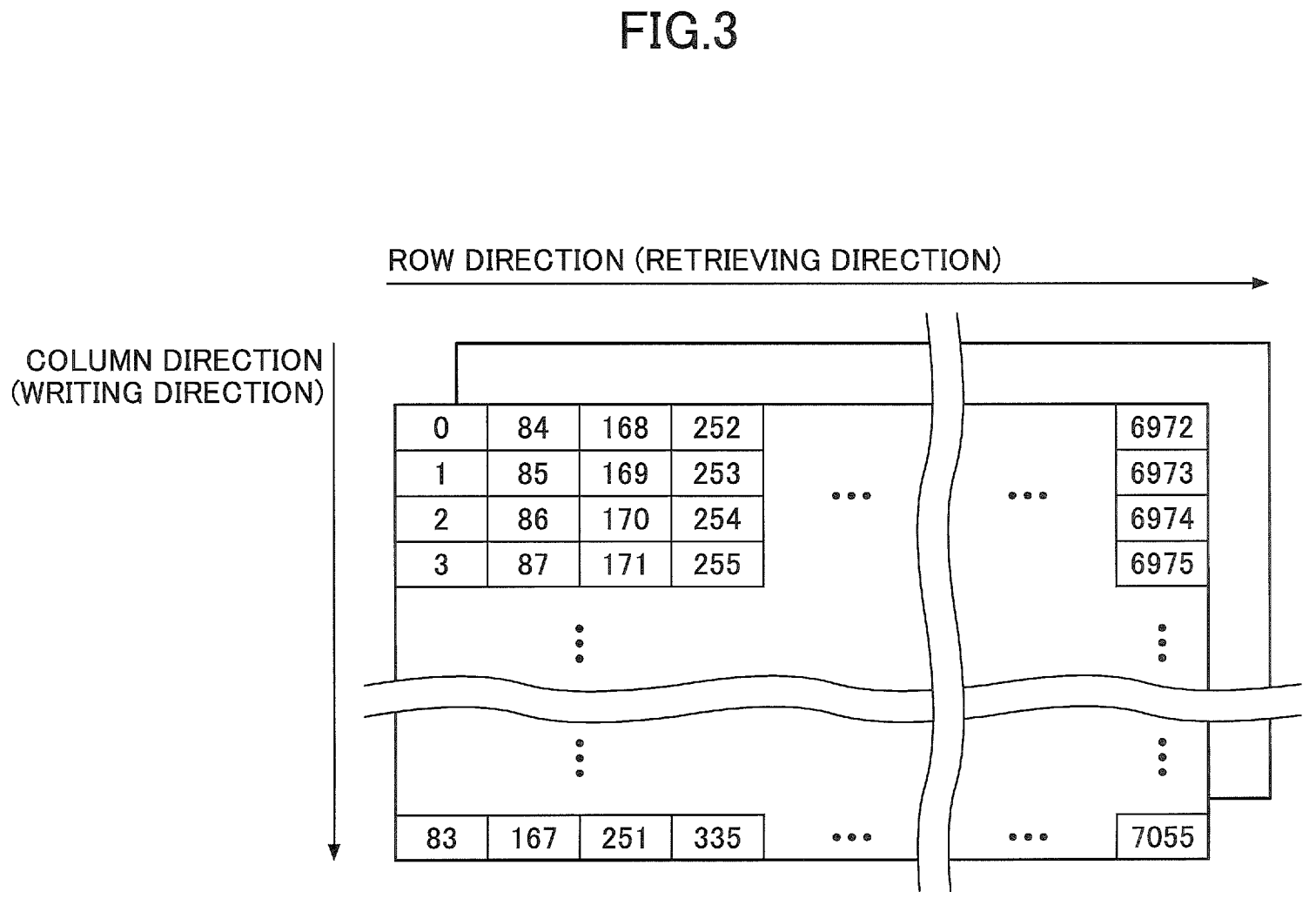

ROW DIRECTION (RETRIEVING DIRECTION)

COLUMN DIRECTION (WRITING DIRECTION)

INPUT DATA

| 1 | 1 | 0 | 1 | 0 | 1 | 1 | 0 | 0 | | 0 | 0 | 0 | 0 | 0 | 0 | 0 | 1 | 0 | | 0 | 0 | 0 | 0 | 1 | 1 | 0 | 0 | 0 | | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|---|---|---|---|---|---|---|

FIG.5B

OUTPUT DATA(SYN0)

| 1 | 1 | 0 | 1 | 0 | 1 | 1 | 0 | 0 | | 0 | 0 | 0 | 0 | 0 | 0 | 0 | 0 | 0 | | 0 | 0 | 0 | 0 | 0 | 0 | 0 | 0 | 0 | | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|---|---|---|---|---|---|---|

FIG.5C

INPUT DATA

| 1 | 1 | 0 | 0 | 0 | 1 | 1 | 0 | 0 | | 1 | 1 | 1 | 0 | 1 | 1 | 1 | 1 | 0 | | 0 | 1 | 0 | 1 | 1 | 1 | 1 | 1 | 1 | | 1 | 0 | 1 | 1 | 0 | 1 | 0 | 1 | 1 |
|---|---|---|---|---|---|---|---|---|---|---|---|---|---|---|---|---|---|---|---|---|---|---|---|---|---|---|---|---|---|---|---|---|---|---|---|---|---|---|

FIG.5D

OUTPUT DATA(SYN1)

| 1 | 1 | 0 | 1 | 0 | 1 | 1 | 0 | 0 | | 1 | 1 | 1 | 1 | 1 | 1 | 1 | 1 | 1 | | 1 | 1 | 1 | 1 | 1 | 1 | 1 | 1 | 1 | | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|---|---|---|---|---|---|---|

FIG.6

ROW DIRECTION (RETRIEVING DIRECTION)

COLUMN DIRECTION (WRITING DIRECTION)

| | | | | | |
|---|---|---|---|---|---|
| 0 | 1 | 2 | 3 | ... | 83 |
| 84 | 85 | 86 | 87 | ... | 167 |
| 168 | 169 | 170 | 171 | ... | 251 |
| 252 | 253 | 254 | 255 | ... | 335 |
| ... | | | | | ... |
| 6972 | 6973 | 6974 | 6975 | ... | 7055 |

FIG.10
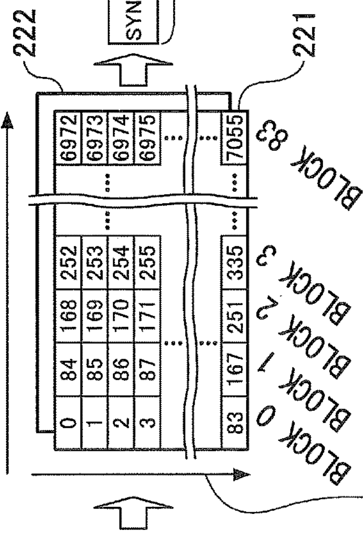
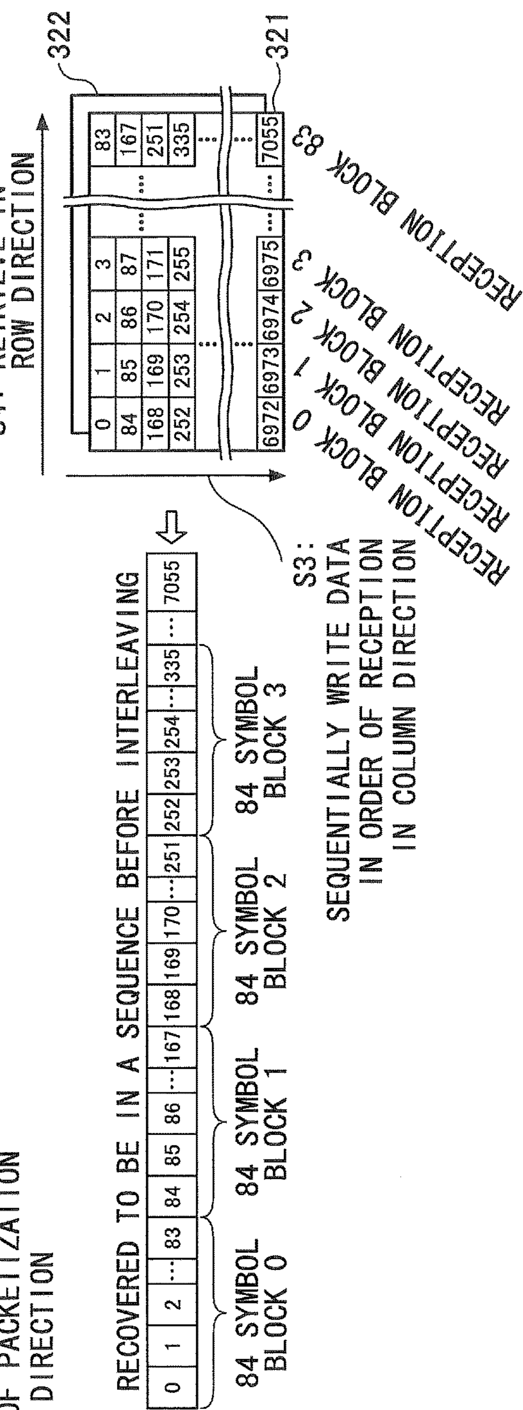

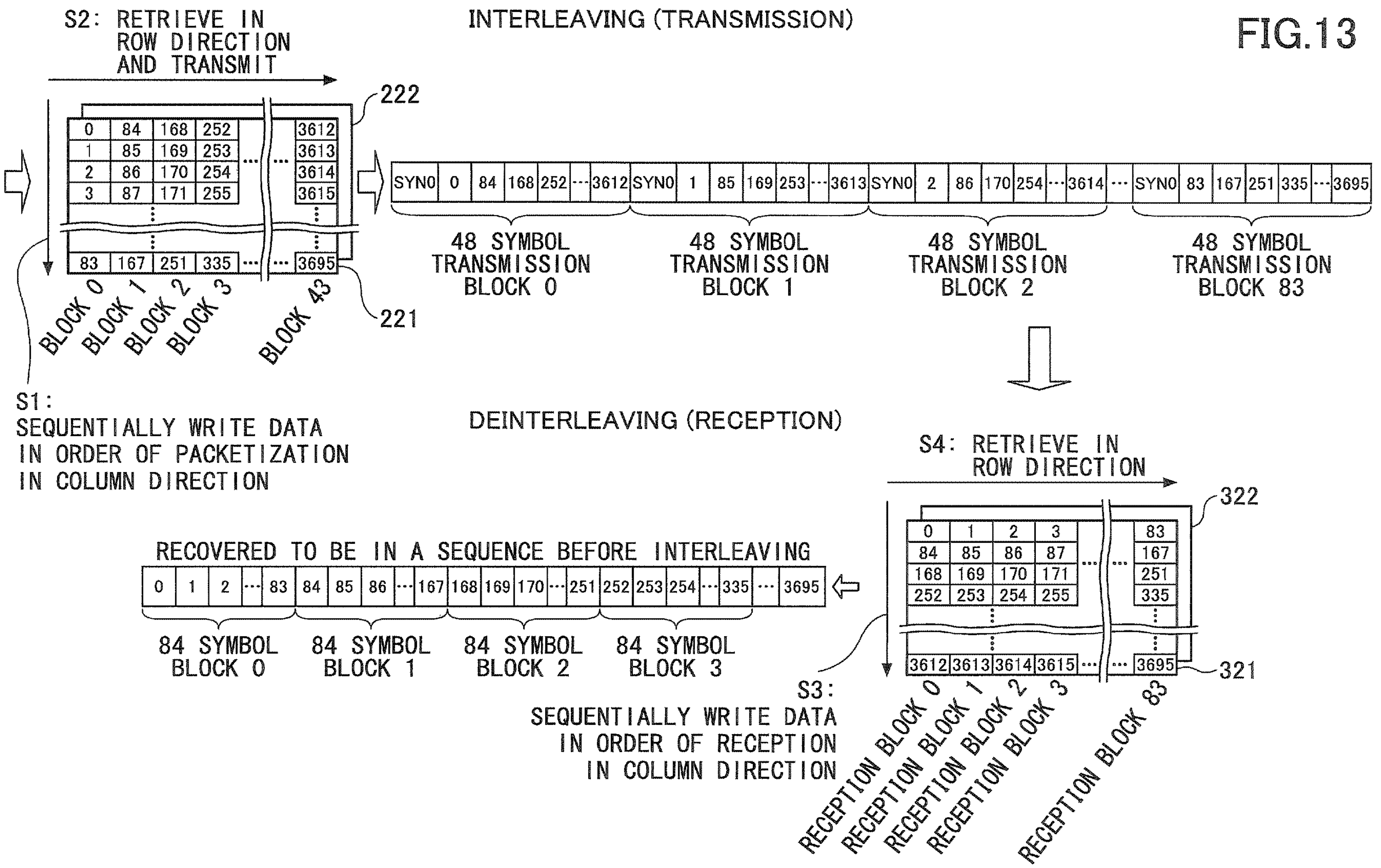
FIG.13
INTERLEAVING (TRANSMISSION)
S2: RETRIEVE IN ROW DIRECTION AND TRANSMIT
222
221
BLOCK 0
BLOCK 1
BLOCK 2
BLOCK 3
BLOCK 43
S1: SEQUENTIALLY WRITE DATA IN ORDER OF PACKETIZATION IN COLUMN DIRECTION
SYN0
48 SYMBOL TRANSMISSION BLOCK 0
48 SYMBOL TRANSMISSION BLOCK 1
48 SYMBOL TRANSMISSION BLOCK 2
48 SYMBOL TRANSMISSION BLOCK 83
DEINTERLEAVING (RECEPTION)
S4: RETRIEVE IN ROW DIRECTION
322
321
RECOVERED TO BE IN A SEQUENCE BEFORE INTERLEAVING
84 SYMBOL BLOCK 0
84 SYMBOL BLOCK 1
84 SYMBOL BLOCK 2
84 SYMBOL BLOCK 3
S3: SEQUENTIALLY WRITE DATA IN ORDER OF RECEPTION IN COLUMN DIRECTION
RECEPTION BLOCK 0
RECEPTION BLOCK 1
RECEPTION BLOCK 2
RECEPTION BLOCK 3
RECEPTION BLOCK 83

DATA TRANSMISSION/RECEPTION SYSTEM, TRANSMISSION APPARATUS AND RECEPTION APPARATUS

BACKGROUND OF THE INVENTION

1. Field of the Invention

The present disclosure relates to a data transmission/reception system, a transmission apparatus and a reception apparatus.

2. Description of the Related Art

A technology is known, in which capability of error correction is improved by diffusing burst error using a method referred to as interleaving where sequence of data is rearranged in transmission and the rearranged sequence is reverted in reception according to the interleaving. In the interleaving, data in which a synchronization signal is added as a header, etc., is transmitted and the rearranged sequence of the received data is reverted based on the synchronization signal, where the synchronization signal is used as a reference for reverting the rearranged data. In a high speed serial data transmission over 1 GHz, even if a pulse width of a noise is less than 1 μs, it causes a burst error in which more than 100 error bits continues. In this case, the error cannot be corrected by using only error correction code, hence the interleaving is used.

In the high speed data transmission, when the burst error occurs, a discrepancy of frequencies between clock signals in transmission side and in reception side occurs due to an error in a CDR (Clock Data Recovery) of a reception side, which may cause a discrepancy of data amounts between transmitted data and received data, or a loss of the synchronization signal due to an error in the synchronization signal. In such case, a data recovery cannot be performed due to an asynchronous state where the transmission side and the reception side are not synchronized to each other. Therefore, a technology is proposed in which the asynchronous state is detected so as to have the transmission side and the reception side be in a synchronous state (for example, Patent Document 1).

However, in the method disclosed in Patent Document 1, the data received before the transmission side and the reception side are transitioned into the synchronous state cannot be recovered since the transmission side and the reception side cannot be transitioned into the synchronous state during the error occurs in the synchronization signal due to the burst error or the like.

RELATED ART DOCUMENT

Patent Document

[Patent Document 1]: Japanese Laid-open Patent Publication No. 2004-208009

SUMMARY OF THE INVENTION

An object of disclosure of the present technology is to keep the synchronous state in a data transmission/reception using the interleaving even if the error in the synchronous signal occurs, thereby reducing occurrence frequency of errors which cause an impossibility of data recovery.

The following configuration is adopted to achieve the aforementioned object.

In one aspect of the embodiment, there is provided a data transmission/reception system for performing a data communication using interleaving, comprising: a transmission apparatus configured to transmit data in which a synchronization signal including identification data is included; and a reception apparatus configured to extract the synchronization signal from the data received from the transmission apparatus, wherein upon detecting that the extracted synchronization signal is not coincident with any one of a plurality of predetermined code strings, the reception apparatus replaces the extracted synchronization signal with one predetermined code string among the plurality of predetermined code strings, wherein inter-code word distances between the respective predetermined code strings and the extracted synchronization signal are calculated and an inter-code word distance between the one predetermined code string and the extracted synchronization signal is the smallest among the calculated inter-code word distances; and the reception apparatus identifies a storage unit for storing the data received from the transmission apparatus based on the identification data included in the replaced synchronization signal, the reception apparatus including a plurality of storage units.

Other objects, features and advantages of the present invention will become more apparent from the following detailed description when read in conjunction with the accompanying drawings.

BRIEF DESCRIPTION OF THE DRAWINGS

FIG. 3 is a diagram for illustrating an example of data stored in memories of an interleaving unit included in a transmission apparatus.

FIG. 5A is a diagram for illustrating an example of "input data" input from a header correction determining unit.

FIG. 5B is a diagram for illustrating an example of "output data" corresponding to FIG. 5A.

FIG. 5C is a diagram for illustrating another example of "input data" input from the header correction determining unit.

FIG. 5D is a diagram for illustrating an example of "output data" corresponding to FIG. 5C.

FIG. 6 is a diagram for illustrating an example data stored in the memories of the deinterleaving unit included in the reception apparatus.

FIG. 10 is a diagram for illustrating an example of the interleaving.

FIG. 13 is a diagram for illustrating an example of the interleaving of the third embodiment.

DETAILED DESCRIPTION OF THE PREFERRED EMBODIMENTS

Herein below, embodiments will be described with reference to the accompanying drawings.

First Embodiment

<System Configuration>

Figure 1:
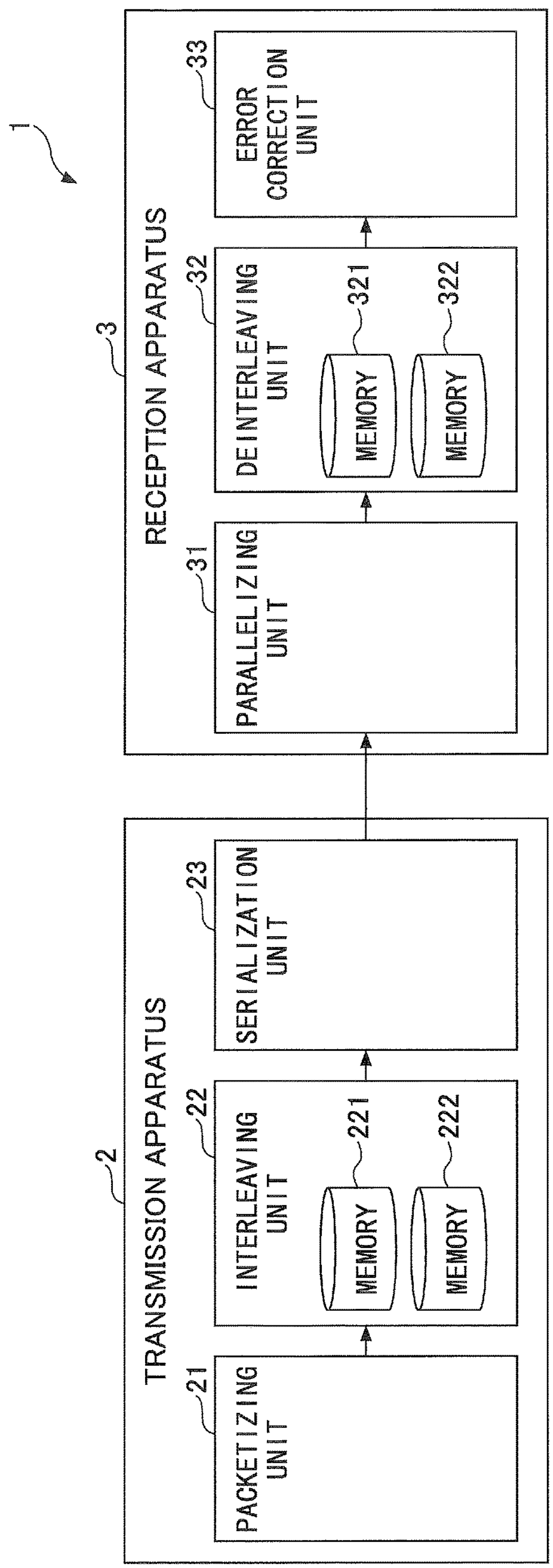
FIG. 1 is a diagram for illustrating an example configuration of a data transmission/reception system of the first embodiment.

FIG. 1 is a diagram for illustrating an example configuration of a data transmission/reception system 1 of the first embodiment. The data transmission/reception system 1 includes a transmission apparatus 2 and reception apparatus 3.

The transmission apparatus 2 includes a packetizing unit 21, an interleaving unit 22 and a serialization unit 23.

The packetizing unit 21 inputs an image data with 32 bits of bus width, etc., to the transmission apparatus 2, and divides the input image data into certain bytes of data to transform them into symbols by using 8b10b encoding which is used for high speed serial data transmission, etc., thereby outputting the symbols to the interleaving unit 22 where headers and ECCs (Error Correcting Code) are added to the symbols.

For example, the interleaving unit 22 includes memories 221 and 222 configured by RAMs (Random Access Memory). The interleaving unit 22 sequentially writes the data input from the packetizing unit 21 in a column direction into the memories 221 or 222 in accordance with the headers. Also, the interleaving unit 22 sequentially retrieves the data stored in the memories 221 or 222 in a row direction, and adds headers to them in accordance with the memories 221 or 222 from which they are retrieved, thereby outputting them to the serialization unit 23.

The serialization unit 23 transforms the data input from the interleaving unit 22 into serial type data and transmits it to the reception apparatus 3.

The reception apparatus 3 includes a parallelizing unit 31, a deinterleaving unit 32 and an error correction unit 33. The deinterleaving unit 32 is an example of a control unit.

The parallelizing unit 31 parallelizes the serial type data received from the transmission apparatus 2, and outputs the parallelized data to the deinterleaving unit 32.

The deinterleaving unit 32 sequentially writes the data input from the parallelizing unit 31 in the column direction into memories in accordance with the headers. The deinterleaving unit 32 sequentially retrieves the data stored in the memories in the row direction and outputs the retrieved data to the error correction unit 33.

The error correction unit 33 performs error correction based on the ECCs added to the data input from the deinterleaving unit 32, and thereby outputs the data, on which the error correction has been performed, as the image data.

Figures 2A, 2B:
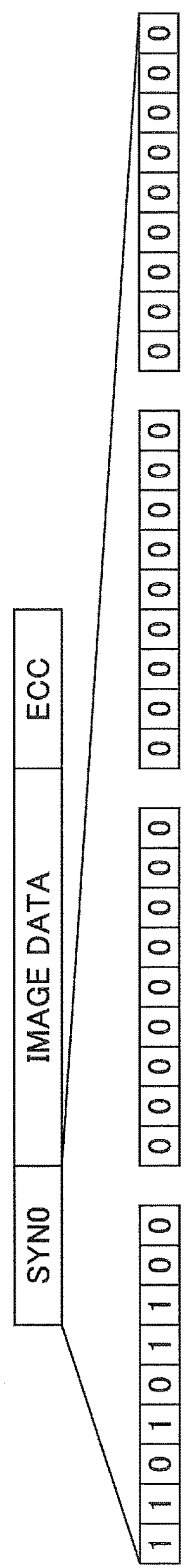
FIG. 2A is a diagram for illustrating an example data structure of a packet and a header thereof.
FIG. 2B is a diagram for illustrating another example data structure of a packet and a header thereof.

FIG. 2A and FIG. 2B are diagrams for illustrating example data structures of packets and headers thereof. FIG. 2A is a diagram for illustrating an example data structure of a packet with SYN0. FIG. 2B is a diagram for illustrating an example data structure of a packet with SYN1. In the present embodiment, two types of header are used. A packet to which a header of "SYN0" is added is stored in the memory 221 of the transmission apparatus 2 and the memory 321 of the reception apparatus 3, while a packet to which a header of "SYN1" is added is stored in the memory 222 of the transmission apparatus 2 and the memory 322 of the reception apparatus 3. SYN0 and SYN1 are examples of a plurality of predetermined code strings set in advance for the transmission apparatus and the reception apparatus. In the present embodiment, both SYN0 and SYN1 include a certain symbol (110101100) as a first symbol, and the rest of three symbols are all set to be "0" in SYN0 while the rest of three symbols are all set to be "1" in SYN1. Additionally, bit structures of SYN0 and SYN1 may be arbitrarily chosen as long as SYN0 and SYN1 can be distinguished from the image data and the ECC. Also, SYN0 and SYN1 may be chosen from a plurality of headers.

FIG. 3 is a diagram for illustrating an example of data stored in the memory 221 and 222 of the interleaving unit 22 included in the transmission apparatus 2. In the present embodiment, the packetizing unit 21 divides the input image data into data of 80 (eighty) bytes, and transforms the each 80 bytes datum into 80 symbols where the respective symbols consist of one bit of a code bit and eight bits of data bits. Any of SYN0 and SYN1 that consists of 4 (four) symbols is added at the head of the aforementioned 80 symbols as a header, and an ECC that consists of 4 symbols is added at the tail of the 80 symbols to create a packet datum consisting of 88 symbols. When 84 (eighty four) packet data are output to the interleaving unit 22, the header is switched to the other one of SYN0 and SYN1.

The interleaving unit 22 writes data of 84 symbols in the column direction, which is extracted from the packet data input from the packetizing unit 21 excluding the 4 symbols of header, into any of memories 221 and 222 selected in accordance with the header. The interleaving unit 22 retrieves the data in the row direction, which is stored in the memory 221 or 222.

Figure 4:
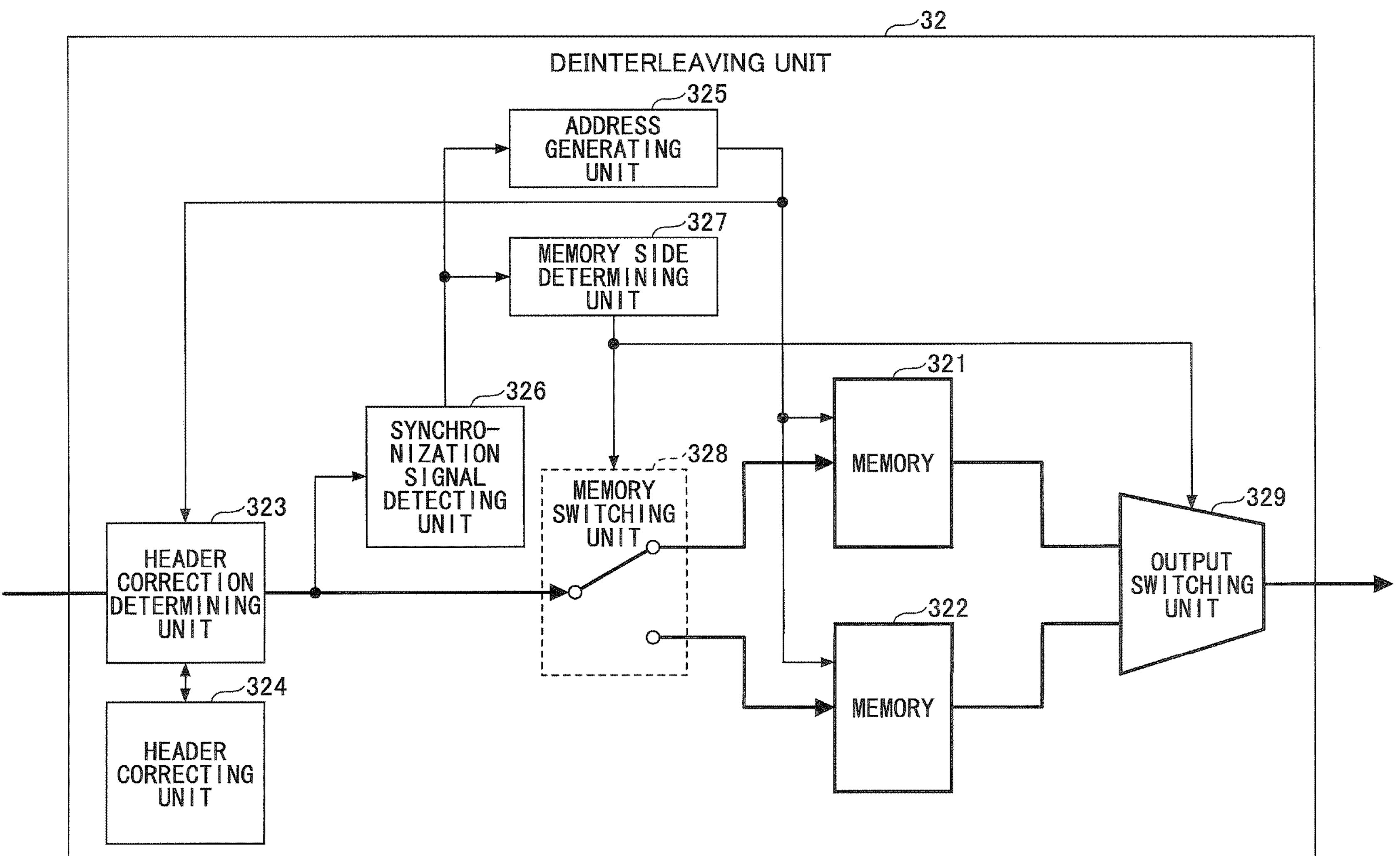
FIG. 4 is a diagram for illustrating an example configuration of a deinterleaving unit of a reception apparatus.

FIG. 4 is a diagram for illustrating an example configuration of the deinterleaving unit 32 of the reception apparatus 3.

The deinterleaving unit 32 includes memories 321 and 322, a header correction determining unit 323, a header correcting unit 324, a synchronization signal detecting unit 326, an address generating unit 325, a memory side determining unit 327, a memory switching unit 328 and an output switching unit 329.

For examples, the memories 321 and 322 are RAMs, etc., for storing the input data.

In every cycle, four symbols of data is input to the header correction determining unit 323 from the parallelizing unit 31. The header correction determining unit 323 detects a position of SYN0 or SYN1 that is the header based on address data input from the address generating unit 325, and thereby determines whether data (bits) at the detected position is coincident with SYN0 or SYN1. In a case where the data at the detected position is coincident with SYN0 or SYN1, the data input from the parallelizing unit 31 is output to the synchronization signal detecting unit 326 and the memory switching unit 328. In a case where the data at the detected position is not coincident with SYN0 or SYN1, the data at the detected position is corrected by the header correcting unit 324 and the data input from the parallelizing unit 31 is output to the synchronization signal detecting unit 326 and the memory switching unit 328.

The header correcting unit 324 calculates an inter-code word distance (hamming distance) between the data input from the header correction determining unit 323 and SYN0 and an inter-code word distance between the data input from the header correction determining unit 323 and SYN1, thereby determining which inter-code word distance is smaller by comparing the inter-code word distances associated with SYN0 and SYN1. The header correction unit 324 replaces the data with SYN0 or SYN1 associated with the inter-code word distance determined to be smaller, thereby outputting the replaced data to the header correction determining unit 323. Here, the inter-code word distance indicates number of digits that are different from each other in two binary numbers having the same digits. For example, the inter-code word distance between "1111111" and "1010101" is "3".

Figure 7:
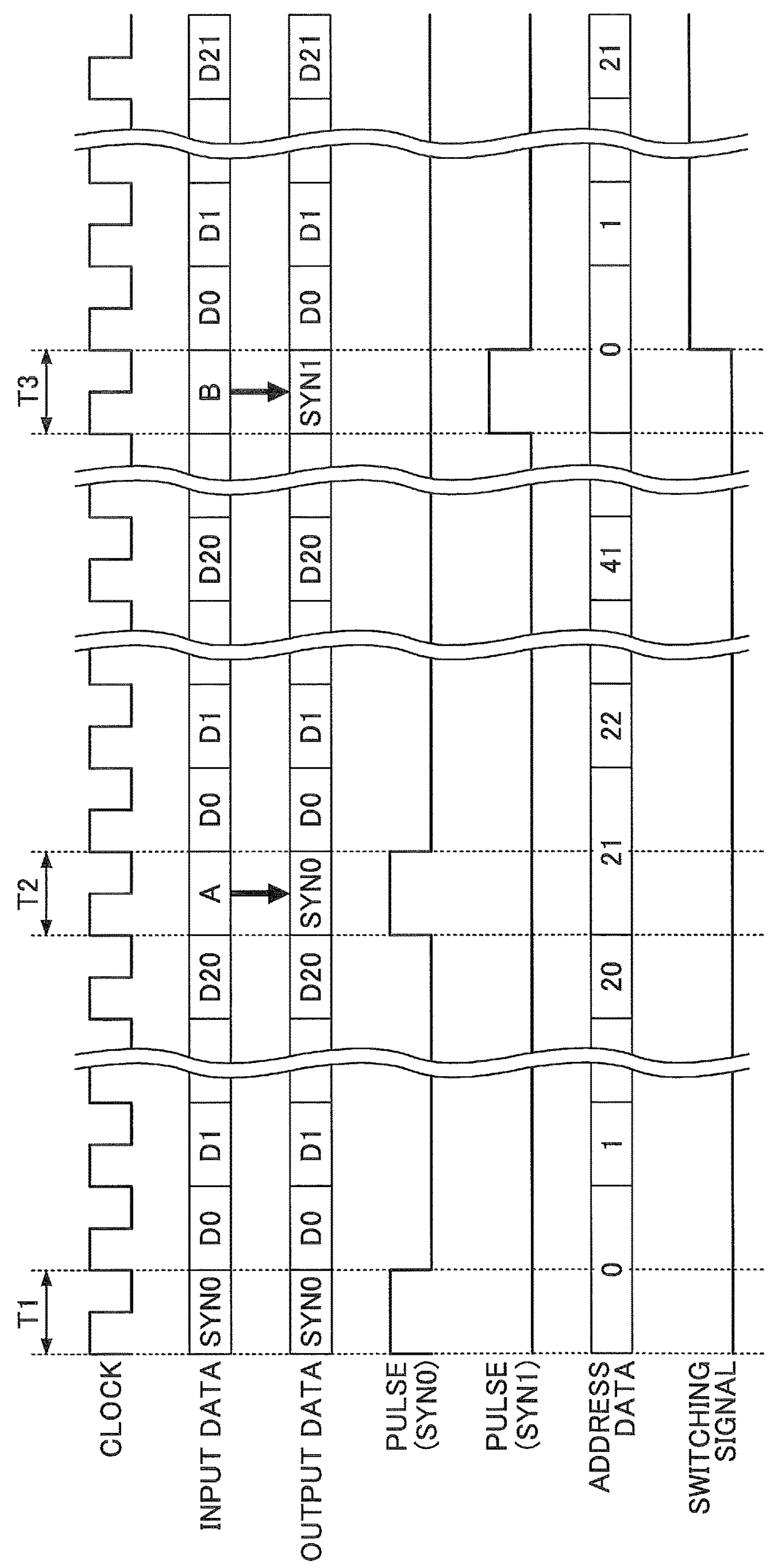
FIG. 7 is a timing diagram for illustrating an operation and timings of the deinterleaving unit included in the reception apparatus.

Upon detecting SYN0 or SYN1 in the data input from the header correction determining unit 323 or the header correcting unit 324, the synchronization signal detecting unit 326 outputs a pulse in accordance with SYN0 or SYN1 to the address generating unit 325 and the memory side determining unit 327 (T1, T2 and T3 shown in FIG. 7).

Upon the header being switched based on the pulse input from the synchronization signal detecting unit 326 where the header serves as the synchronization signal as well as the data indicating a memory side, the memory side determining unit 327 outputs a switching signal to the memory switching unit 328 and the output switching unit 329, thereby switching the memories for writing and for retrieving. For example, in a case where the pulse associated with SYN0 is changed into the pulse associated with SYN1, the memory for writing is switched from the memory 321 into the memory 322 and the memory for retrieving is switched from the memory 322 into the memory 321.

The address generating unit 325 increments a value of an address at positions other than that of SYN0 or SYN1, which is the synchronization signal, based on input from the synchronization signal detecting unit 326, thereby generating the address data for accessing the memory and outputting the address data to the header correction determining unit 323 and the memories 321 and 322. Upon the memory side being switched, the address data is initialized (T3 shown in FIG. 7).

The memory switching unit 328 switches the memory for wiring in accordance with the switching signal from the memory side determining unit 327.

For example, the output switching unit 329 is a multiplexer, etc., and the output switching unit 329 switches the memory for retrieving in accordance with the switching signal from the memory side determining unit 327.

FIG. 5A-5D are diagrams for illustrating an example of header correction performed by the header correcting unit 324. FIG. 5A is a diagram for illustrating an example of "input data" input from the header correction determining unit 323. FIG. 5B is a diagram for illustrating an example of "output data" corrected and output as SYN0. FIG. 5C is a diagram for illustrating another example of "input data" input from the header correction determining unit 323. FIG. 5D is a diagram for illustrating an example of "output data" corrected and output as SYN1. In a case where the input data is that shown in FIG. 5A, the inter-code word distance between the input data and SYN0 is "3" while the inter-code word distance between the input data and SYN1 is "24". In this case, since the inter-code word distance associated with SYN0 is smaller, the input data shown in FIG. 5A is corrected to be the output data (SYN0) shown in FIG. 5B, and the corrected output data is output (T2 shown in FIG. 7).

Also, in a case where the input data is that shown in FIG. 5C, the inter-code word distance between the input data and SYN0 is "21" while the inter-code word distance between the input data and SYN1 is "7". In this case, since the inter-code word distance associated with SYN1 is smaller, the input data shown in FIG. 5C is corrected to be the output data (SYN1) shown in FIG. 5D, and the corrected output data is output (T3 shown in FIG. 7).

FIG. 6 is a diagram for illustrating an example data stored in the memory 321 or 322 of the deinterleaving unit 32 included in the reception apparatus 3. The deinterleaving unit 32 sequentially writes the data other than the header in the column direction into one of the memories 321 and 322 selected in accordance with the header of the data input from the parallelizing unit 31, and it sequentially retrieves the stored data in the row direction. Hence, the data before interleaving can be obtained.

FIG. 7 is a timing diagram for illustrating an operation and timings of the deinterleaving unit 32 included in the reception apparatus 3. In FIG. 7, the input data to the header correction determining unit 323, the output data from the header correction determining unit 323 or the header correcting unit 324, the pulses output from the synchronization signal detecting unit 326 in accordance with SYN0 and SYN1, the address data output from the address generating unit 325 and the switching signal output from the memory side determining unit 327 are shown where the respective data and signals are generated based on the clock signal.

<Operations>

In the following, operations of the data transmission/reception system will be described. First, an operation of the transmission apparatus 2 will be described.

Figure 8:
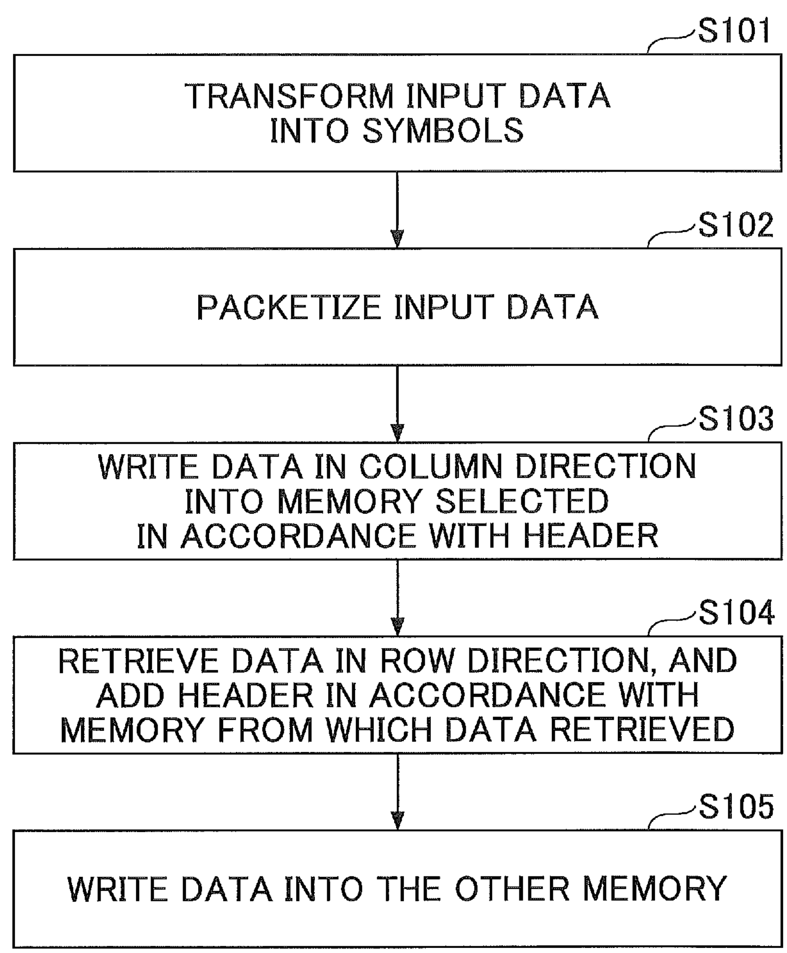
FIG. 8 is a flowchart for illustrating an example operation of the transmission apparatus.

FIG. 8 is a flowchart for illustrating an example operation of the transmission apparatus 2.

In step S101 shown in FIG. 8, the packetizing unit 21 divides the input image data into certain bytes of data to transform the respective byte data into symbols.

In step S102, the packetizing unit 21 adds the header at the head of the divided datum and adds ECC at the tail of the divided datum, thereby packetizing the input data.

In step S103, the interleaving unit 22 sequentially writes the data other than the header in the column direction into one of the memories 221 and 222 selected in accordance with the header.

In step S104, upon the data being written in all sides of the memory, the interleaving unit 22 retrieves the data stored in the memory in the row direction, and adds one of SYN0 and SYN1 in accordance with the memory from which the data retrieved. Then, the interleaving unit 22 transmits the data to the reception apparatus 3 by using the serialization unit 23.

In step S105, the interleaving unit 22 retrieves the data from one of the memories while it writes the data into the other memory.

Figure 9:
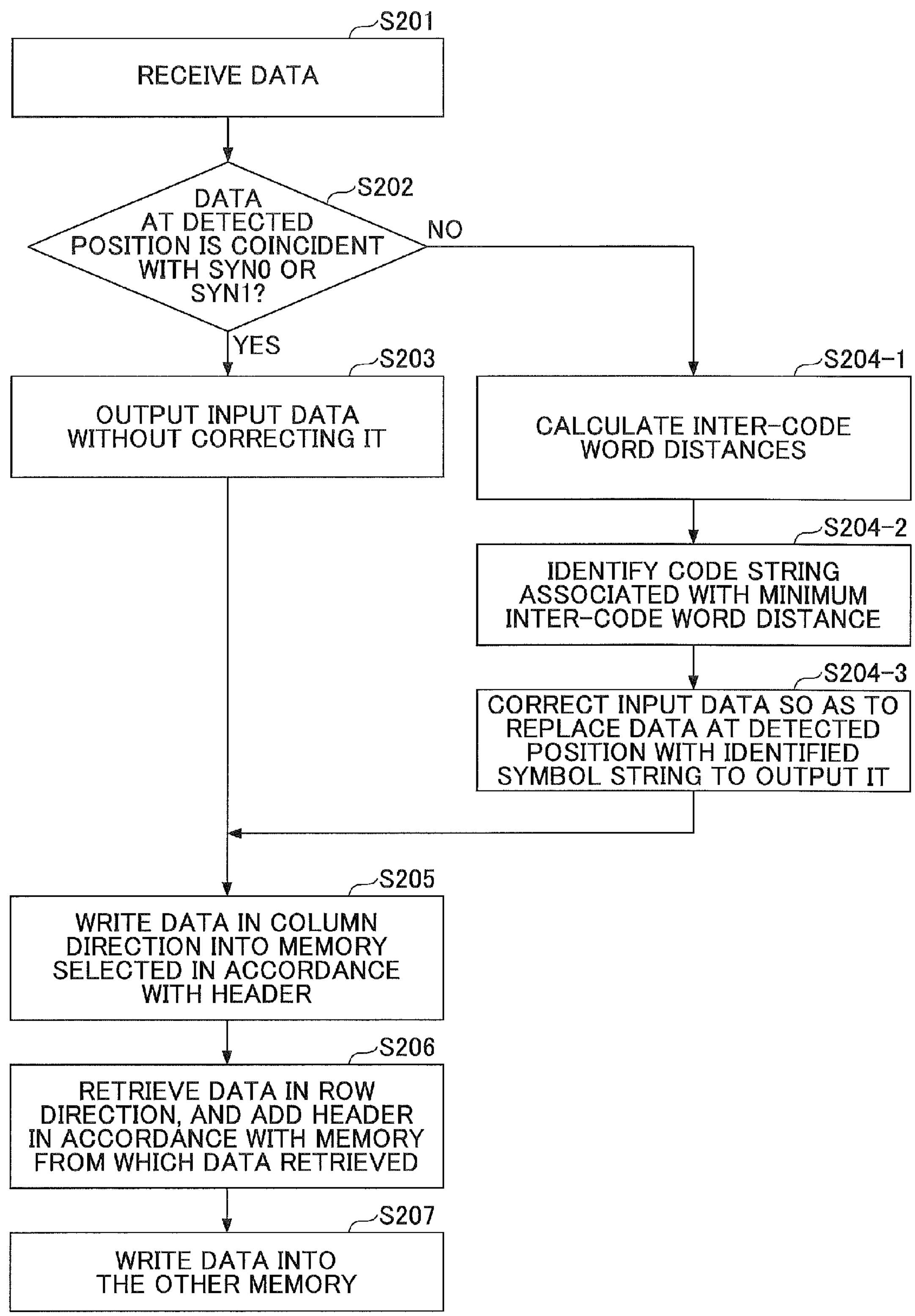
FIG. 9 is a flowchart for illustrating an example operation of the reception apparatus.

FIG. 9 is a flowchart for illustrating an example operation of the reception apparatus 3.

In step S201 shown in FIG. 9, the parallelizing unit 31 receives the serial type data from the transmission apparatus 2.

In step S202, the header correction determining unit 323 of the deinterleaving unit 32 detects the position of SYN0 or SYN1, which is the header, based on the address generated by the address generating unit 325, and thereby determines whether data (bits) at the detected position is coincident with SYN0 or SYN1. In a case where the data at the detected position is coincident with SYN0 or SYN1, the process is proceeded to step S203 (YES in step S202). In a case where the data at the detected position is not coincident with SYN0 or SYN1, the process is proceeded to step S204-1 (NO in step S202).

In step S203, the header correction determining unit 323 outputs the input data without correcting the input data (as it is) (T1 shown in FIG. 7).

In step S204-1, the header correcting unit 324 calculates the inter-code word distance between the data at the detected position and the symbol string (or code string) SYN0 and the inter-code word distance between the data at the detected position and the symbol string SYN1.

In step S204-2, the symbol string with which the smaller inter-code word distance is associated is identified by comparing the calculated inter-code word distances.

In step S204-3, the input data is corrected so as to replace the data at the detected position with the identified symbol string to be output.

In step S205, the data other than the header is sequentially written in the column direction into one of the memories 321 and 322 selected in accordance with the header.

In step S206, upon the data being written in all sides of the memory, the deinterleaving unit 32 sequentially retrieves the data in the row direction from the memory to perform the error correction by the error correction unit 33 using the ECC added at the tail of the data, thereby outputting the data as the image data.

In step S207, the deinterleaving unit 32 retrieves the data from one of the memories while the deinterleaving unit 32 writes the data into the other memory.

FIG. 10 is a diagram for illustrating an example of the interleaving.

The interleaving unit 22 of the transmission apparatus 2 sequentially writes (S1 shown in FIG. 10) the 84 symbols other than 4 symbols of header at the head of 88 symbols of the data input from the packetizing unit 21 in the column direction as respective blocks, such that "0, 1, 2, 3, . . . , 83" is written as block 0, "84, 85, 86, . . . , 167" is written as block 1, and "168, 169, 170, . . . , 251" is written as block 2. Then, the data is retrieved in the row direction from the memory 221 or 222 as respective transmission blocks, such that "0, 84, 168, 252, . . . , 6972" is retrieved as transmission block 0, "1, 85, 169, 253, . . . , 6973" is retrieved as transmission block 1 and "2, 86, 170, 254, . . . , 6974" is retrieved as transmission block 2. The retrieved data is transmitted from the serialization unit 23 to the reception apparatus 3 (S2 shown in FIG. 10). Thus, error distribution becomes uniform when the burst error occurs since the respective symbols in a block are diffused to a plurality of the transmission blocks. Therefore, impossibility of data recovery due to errors occurred within the same block, which causes an error exceeding the correction capability of the error correction code, can be avoided.

The deinterleaving unit 32 of the reception unit 3 sequentially writes (S3 shown in FIG. 10) the data other than the header of the data received by the parallelizing unit 31 in the column direction as respective reception blocks, such that "0, 84, 168, 252, . . . , 6972" is written as reception block 0, "1, 85, 169, 253, . . . , 6973" is written as reception block 1 and "2, 86, 170, 254, . . . , 6974" is written as reception block 2. Then, the data stored in the memory is sequentially retrieved in the row direction (S4 shown in FIG. 10), such that "0, 1, 2, 3, . . . , 83" is retrieved as block 0, "84, 85, 86, . . . , 167" is retrieved as block 1, and "168, 169, 170, . . . , 251" is retrieved as block 2. Thus, the data is recovered to be in a sequence before the interleaving.

Second Embodiment

Figure 11:
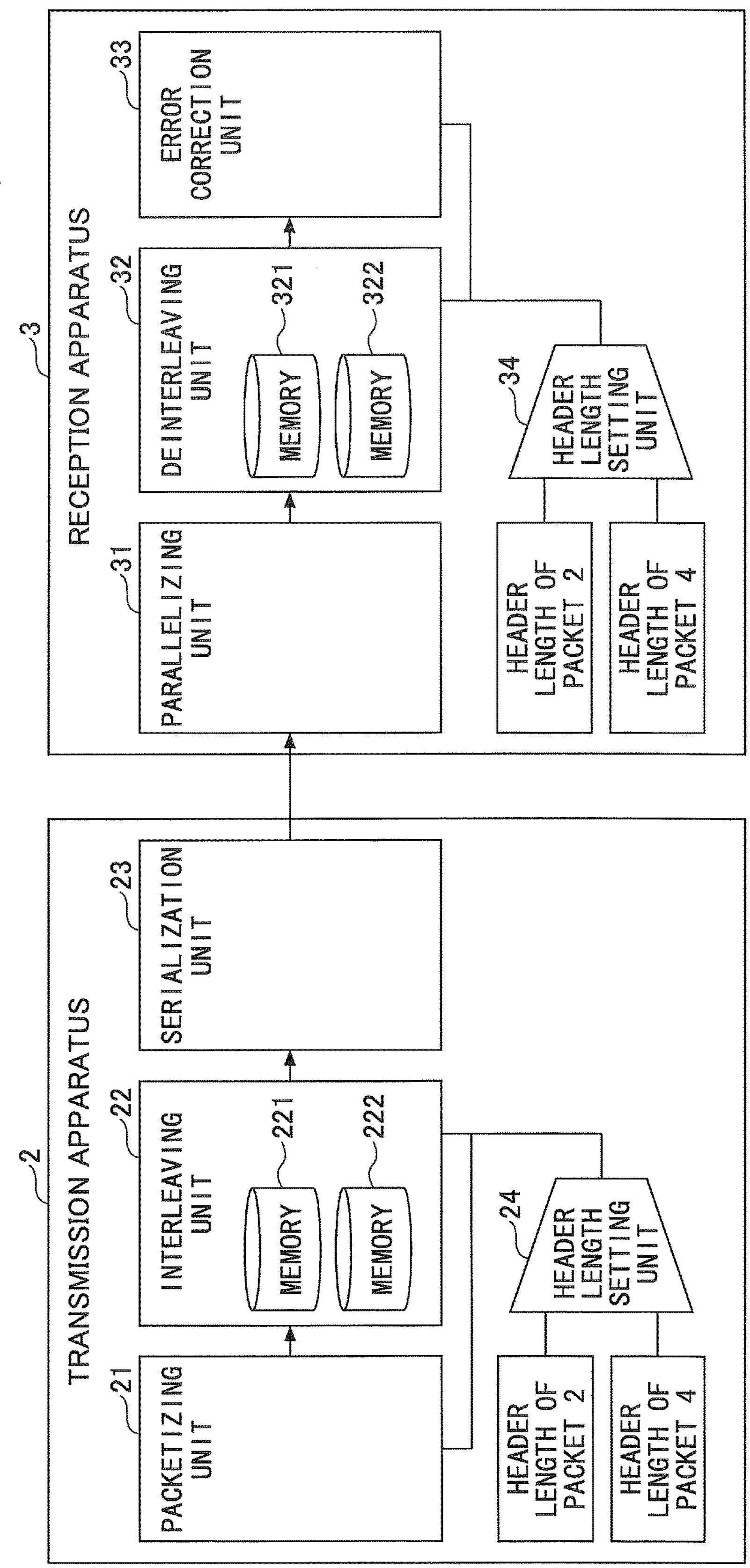
FIG. 11 is a diagram for illustrating an example configuration of the data transmission/reception system of the second embodiment.

FIG. 11 is a diagram for illustrating an example configuration of the data transmission/reception system 1 of the second embodiment.

In the second embodiment, the transmission apparatus 2 and the reception apparatus 3 respectively include a header length setting units 24 and 34 for setting a header length of the packet, which is different from the data transmission/reception system 1 of the first embodiment. For example, the header length is selected to be any one of 2 (two) symbols and 4 (four) symbols.

When the header length is set to be short, error resistance is reduced since the inter-code word distance between SYN0 and SYN1 decreases, while data transfer efficiency is improved since the amount of data added to the image data decreases. According to the second embodiment, for example, the header length can be set in accordance with an error rate of a transmission path.

Third Embodiment

Figure 12:
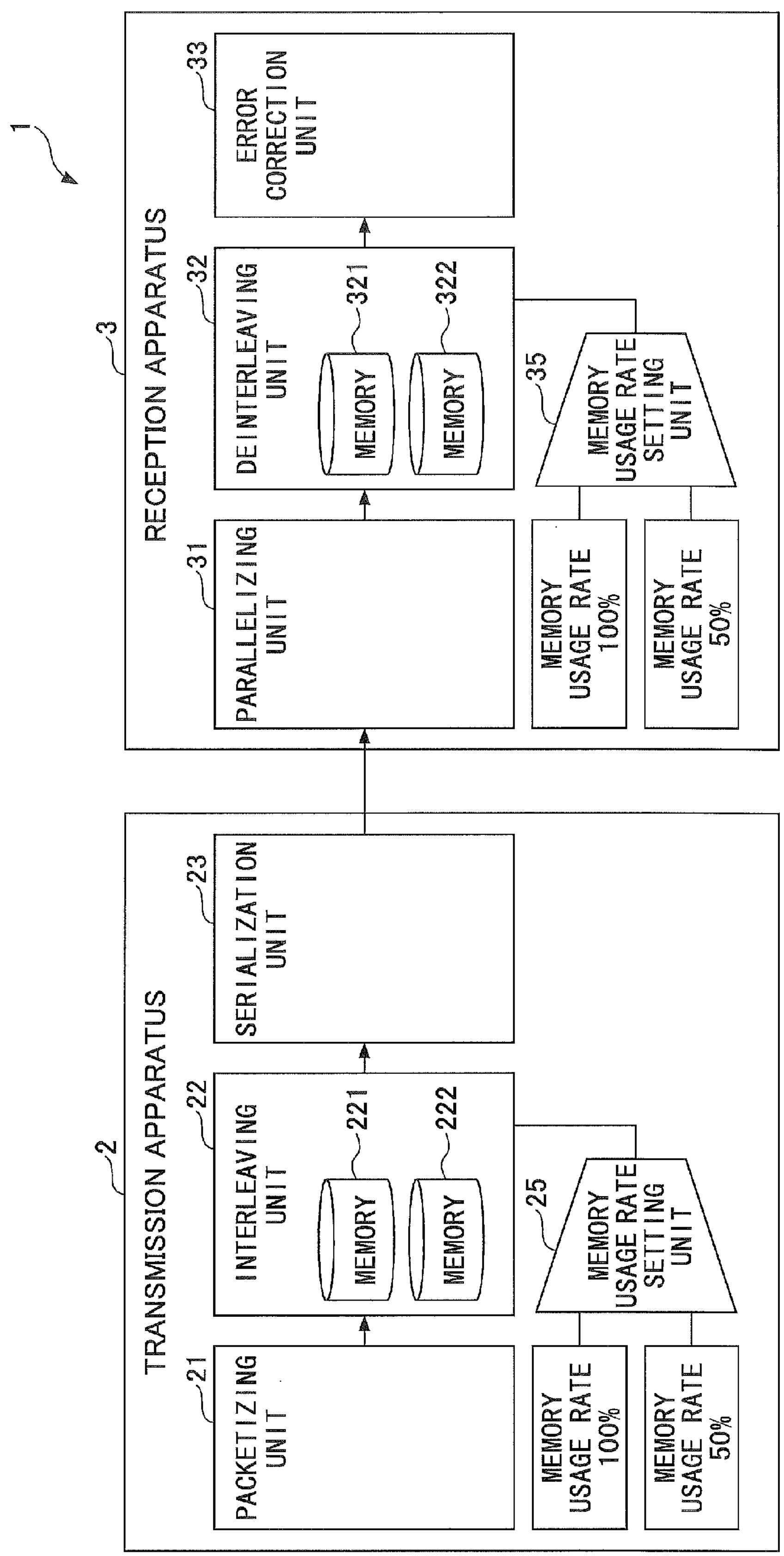
FIG. 12 is a diagram for illustrating an example configuration of the data transmission/reception system of the third embodiment.

FIG. 12 is a diagram for illustrating an example configuration of the data transmission/reception system 1 of the third embodiment.

In the third embodiment, the transmission apparatus 2 and the reception apparatus 3 respectively include a memory usage rate setting units 25 and 35 for setting a memory usage rate, which is different from the data transmission/reception system 1 of the first embodiment. For example, the memory usage rate is selected to be any one of 100% and 50%.

FIG. 13 is a diagram for illustrating an example of the interleaving of the third embodiment.

In a case where the memory usage rate is set to be 100%, the 84 symbols other than the header are sequentially written in 84 columns in the respective memories of the transmission apparatus 2 and the reception apparatus 3 as described in the first embodiment.

In a case where the memory usage rate is set to be 50%, the number of columns and rows in the respective memories in the transmission apparatus 2 and the reception apparatus 3 for storing the data are set to be half. That is, upon the 84 symbols are written in 44 columns in one of the memories 221 and 222 (S1 shown in FIG. 13), the interleaving unit 22 of the transmission apparatus 2 switches the memory for writing into the other memory while the interleaving unit 22 sequentially retrieves the data in the row direction from the one of the memories where 44 symbols are respectively retrieved from 84 rows of the one of the memories. The header corresponding to the one of the memories is added to the retrieved 44 symbols, thereby transmitting 48 symbols (S2 shown in FIG. 13). Then, upon the 84 symbols are written in 44 columns in the other memory, the interleaving unit 22 switches the memory for writing into the one of the memories while the interleaving unit 22 sequentially retrieves the data in the row direction from the other memory where 44 symbols are respectively retrieved from 84 rows of the other memory. The header corresponding to the other memory is added to the retrieved symbols, thereby transmitting the data of the symbols.

The deinterleaving unit 32 of the reception apparatus 3 writes the 44 symbols into 84 columns in the memory corresponding to the header (S3 shown in FIG. 13), and retrieves the data in the row direction where 84 symbols are retrieved from respective 44 columns (S4 shown in FIG. 13). Thus, the memory usage rate of the transmission apparatus 2 and the reception apparatus 3 is changed to be 50%.

Additionally, upon 44 packets being output from the packetizing unit 21 to the interleaving unit 22, the header may be switched to SYN0 or SYN1 instead of switching the memories 221 and 222 by the interleaving unit 22. Also, in the present embodiment, the data is written in 44 rows and 44 symbols are sequentially retrieved to be added the header of 4 symbols thereto, thereby transmitting the data of 48 symbols since the header correction determining unit 323 retrieves 4 symbols in every cycle. However, the data may be written in 42 rows and 42 symbols may be sequentially retrieved to be added the header of 4 symbols and dummy data of 2 symbols thereto, thereby transmitting the data of 48 symbols.

When the memory usage rate is set to be low, the error resistance is reduced since a diffusion rate of the data in the interleaving decreases, while the data transfer efficiency is improved since the time to be taken for the interleaving decreases. According to the third embodiment, for example, the memory usage rate can be set in accordance with an error rate of a transmission path.

Fourth Embodiment

In the fourth embodiment, the address generating unit 325 of the reception apparatus 3 has a function for correcting the address data when the position of the header varies from an expected position due to a data loss occurred in the data transmission, which is different from the first embodiment.

Figure 14:
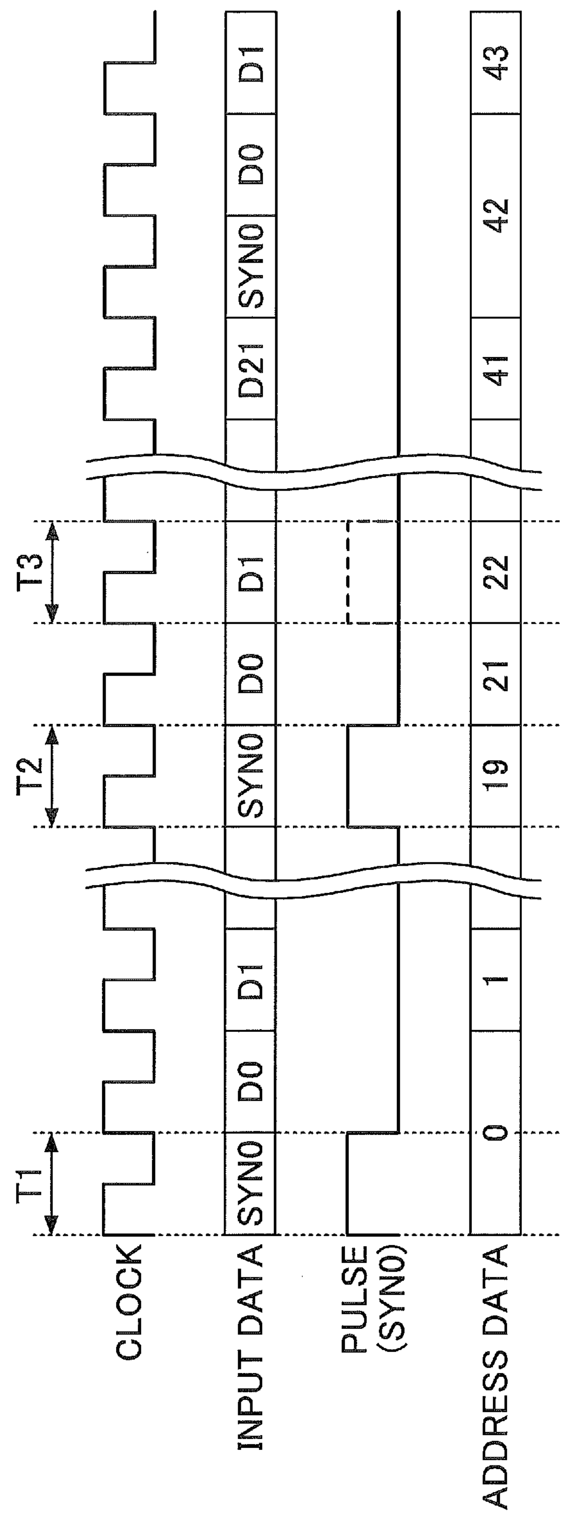
FIG. 14 is a diagram for illustrating an example of data correction performed when a position of the header varies from an expected position.

FIG. 14 is a diagram for illustrating an example of data correction performed when the position of the header varies from an expected position.

The header is expected to be input when the address data becomes a multiple of a predetermined value ("21" in the present embodiment) as shown in FIG. 7 since the address data indicating the address for storing the received data is incremented in response to every input of data other than the header unless the data loss occurs.

Therefore, if the data coincident with SYN0 or SYN1 is input at a position (for example, T2 shown in FIG. 14) other than the position (for example, T3 shown in FIG. 14) corresponding to the address data that is the multiple of a predetermined value and at which the header is expected to be input, the data loss due to a condition of the transmission path should be assumed. In this case, if the address data is incremented without being corrected, the position of the header varies from the expected position.

In the example shown in FIG. 14, the data coincident with SYN0 or SYN1 is expected to be input at the position of T3. However, if the data coincident with SYN0 or SYN1 is input at a position (for example, T2 shown in FIG. 14) other than the position of T3, the data loss due to the condition of the transmission path should be assumed. In this case, if the address data is incremented without being corrected, the value of the address data corresponding to 4 symbols of the data "D0" input just after T2 shown in FIG. 14 becomes 20, where the data "D0" is accordingly stored in "80"-"83" shown in FIG. 6. Therefore, the address data corresponding to the data input just after the data coincident with SYN0 or SYN1 is corrected to be the multiple of the predetermined value at which SYN0 or SYN1 is expected to be received as shown in FIG. 7. Hence, the data D0 input just after T2 shown in FIG. 14 is accordingly stored in "84"-"87" shown in FIG. 6 since the value of the address data corresponding to the data D0 is corrected to be "21".

Additionally, the address data correction may not be performed every time when an occurrence of the variance of position, where the synchronization signal is received, is detected, and the address data correction may be performed when a counted value exceeds a threshold value where occurrence of the variance of the position is counted. Thus, a false detection of the header position can be prevented even if a part of the image data becomes coincident with SYN0 or SYN1 due to an error.

Additionally, in the embodiments described above, although the packet including the header consisting of 4 symbols, the image data consisting of 80 symbols and the ECC consisting of 4 symbols are transmitted/received, the number of symbols constituting the header, the image data and the ECC may be arbitrarily chosen.

Also, in the embodiments described above, although the header is switched when 84 packets adding one of SYN0 and SYN1 are output from the packetizing unit 21 to the interleaving unit 22, the number of the packets for switching the header may be arbitrarily chosen.

Further, in the embodiments described above, although the deinterleaving unit 32 switches the two memories so that one of the memories is for writing and the other is for retrieving, three or more memories may be used in the writing-retrieving rotation.

Also, in the embodiments described above, although the header correction determining unit 323 retrieves 4 symbols from the parallelizing unit 31 in every cycle, the number of symbols retrieved in every cycle may be arbitrarily chosen.

Also, the transmission apparatus 2 and the reception apparatus 3 may be included in one apparatus or may be separately formed. Further, the transmission apparatus 2 and the reception apparatus 3 may be respectively configured by a plurality of apparatuses.

Also, the transmission apparatus 2 and the reception apparatus 3 may be achieved by installing a program for performing the aforementioned processes or operations to a computer including a personal computer, tablet type computer, and the like. In the embodiments described above, although the image data is transmitted/received, this is not a limiting example. Arbitrary data including document data, moving picture data, etc., may be transmitted/received.

Herein above, although the invention has been described with respect to a specific embodiment, the appended claims are not to be thus limited. It should be understood that the various changes, substitutions, and alterations could be made hereto without departing from the spirit and scope of the claims. Further, all or part of the components of the embodiments described above can be combined. The present application is based on Japanese Priority Application No. 2014-226112 filed on Nov. 6, 2014, the entire contents of which are hereby incorporated herein by reference.

What is claimed is:

1. A data transmission/reception system for performing a data communication using interleaving, comprising:

One or more processors that are configured to function as:

a transmission apparatus configured to transmit data in which a synchronization signal including identification data is included; and a reception apparatus configured to extract the synchronization signal from the data received from the transmission apparatus, wherein upon detecting that the extracted synchronization signal is not coincident with any one of a plurality of predetermined code strings, the reception apparatus replaces the extracted synchronization signal with one predetermined code string among the plurality of predetermined code strings, wherein inter-code word distances between the respective predetermined code strings and the extracted synchronization signal are calculated and an inter-code word distance between the one predetermined code string and the extracted synchronization signal is the smallest among the calculated inter-code word distances; and the reception apparatus identifies a storage unit for storing the data received from the transmission apparatus based on the identification data included in the replaced synchronization signal, the reception apparatus including a plurality of storage units.

2. The data transmission/reception system as claimed in claim 1, wherein the one or more processors is further configured to function as:

a first length changing unit configured to change a length of the synchronization signal, and a second length changing unit configured to change lengths of the plurality of the predetermined code strings.

3. The data transmission/reception system as claimed in claim 1, wherein the transmission apparatus and the reception apparatus respectively comprise a usage rate changing unit configured to change a usage rate of the storage units.

4. The data transmission/reception system as claimed in claim 1, wherein upon detecting that a position of the extracted synchronization signal in the received data is not coincident with a position at which the synchronization signal is expected to be inserted, the reception apparatus changes an address associated with data inserted just after the extracted synchronization signal into an address associated with data inserted just after the position at which the synchronization signal is expected to be inserted, the data being stored in the storage unit in accordance with the associated address.

5. The data transmission/reception system as claimed in claim 4, wherein the reception apparatus increments a counter value upon detecting that the position of the extracted synchronization signal in the received data is not coincident with a position at which the synchronization signal is expected to be inserted, and the change of the address is performed upon the counter value exceeding a threshold value.

6. A transmission apparatus of a data transmission/reception system for performing a data communication using interleaving which includes the transmitting apparatus and a reception apparatus, the transmission apparatus comprising:

a processor that is configured to function as:

a data transmission unit configured to transmit data in which identification data is included wherein the identification data is used for identifying a storage unit in the reception apparatus for storing the data received from the transmission apparatus, the reception apparatus including a plurality of storage units, wherein the processor is further configured to function as:

a packaging unit that is configured to divide input data into predetermined number of bytes and convert each divided data into a symbol, and a interleaving unit that is configured to add a header at a head of each of the divided data and an error correction code at a tail of each of the divided data as the identification data.

7. A reception apparatus of a data transmission/reception system for performing a data communication using interleaving which includes a transmitting apparatus and the reception apparatus, the reception apparatus comprising a processor that is configured to function as:

a signal detecting unit configured to extract a synchronization signal from the data received from the transmission apparatus;

a correcting unit configured to replace the extracted synchronization signal with one predetermined code string among a plurality of predetermined code strings upon detecting that the extracted synchronization signal is not coincident with any one of the plurality of predetermined code strings, wherein inter-code word distances between the respective predetermined code strings and the extracted synchronization signal are calculated and an inter-code word distance between the one predetermined code string and the extracted synchronization signal is the smallest among the calculated inter-code word distances; and a determining unit configured to identify a storage unit for storing the data received from the transmission apparatus based on the identification data included in the replaced synchronization signal, the reception apparatus including a plurality of storage units.

8. The transmission apparatus as claimed in claim 6, wherein the processor is further configured to function as the interleaving unit that is configured to write each of the divided data except for the header in column direction into one of a plurality of memories in accordance with the header of the each of the divided data and retrieve the each of the divided data in the memories in a row direction.

* * * * *